(12) United States Patent
Cook

(10) Patent No.: US 6,788,332 B1
(45) Date of Patent: Sep. 7, 2004

(54) WIRELESS IMAGING DEVICE AND SYSTEM

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/474,575

(22) Filed: Dec. 29, 1999

(51) Int. Cl.[7] .................................................. H04N 7/14
(52) U.S. Cl. ........................ 348/14.02; 348/14.01; 348/222.1; 455/556.1
(58) Field of Search ............................ 348/14.01, 14.02, 348/14.03, 14.04, 14.05, 14.07, 14.08, 14.09, 207, 552, 231, 232, 233, 211.3; 455/566, 556, 557; D16/202; H04N 7/14

(56) References Cited

U.S. PATENT DOCUMENTS

| | | |
|---|---|---|
| 5,737,491 A | 4/1998 | Allen et al. |
| 5,806,005 A | 9/1998 | Hull et al. |
| 5,917,542 A | 6/1999 | Moghadam et al. |
| 6,192,257 B1 * | 2/2001 | Ray ............................ 455/566 |

FOREIGN PATENT DOCUMENTS

| | | | | |
|---|---|---|---|---|
| JP | 404172888 A | * | 6/1992 | ............ H04N/7/14 |
| JP | 406268582 A | * | 9/1994 | ............ H04B/7/26 |
| JP | 410336238 A | * | 12/1998 | ............ H04L/12/54 |
| JP | 411032316 A | * | 2/1999 | ............ H04N/7/14 |
| JP | 411146370 A | * | 5/1999 | ............ H04N/7/14 |
| JP | 411275275 A | * | 10/1999 | ............ H04N/1/00 |

* cited by examiner

*Primary Examiner*—Melur Ramakrishnaiah
(74) *Attorney, Agent, or Firm*—Brooks Kushman P.C.

(57) ABSTRACT

A handheld, portable device for capturing and communicating digital images includes a digital camera having an electronic image sensor for sensing an image and producing a digital image indicative of the sensed image. The device further includes a wireless transceiver having a transmitter operable with the digital camera for transmitting the digital image over a wireless communications link through the establishment of a data call. A second device having a wireless transceiver may communicate digital images over the wireless communications link through the establishment of the data call with the wireless transceiver of the first device.

2 Claims, 1 Drawing Sheet

WIRELESS IMAGING DEVICE AND SYSTEM

TECHNICAL FIELD

The present invention relates generally to digital cameras and, more particularly, to a digital camera capable of wireless transmission and reception.

BACKGROUND ART

Wireless communication is used to transmit digital data between a source and a destination. Individuals use portable digital cameras, or electronic cameras, to capture digital images. What is needed is a digital camera having an integrated wireless transceiver for communicating captured digital images between the digital camera and a remote user.

SUMMARY OF THE INVENTION

Accordingly, it is an object of the present invention to provide a digital camera having an integrated wireless transceiver for communicating captured digital images such as still images, moving images, and facsimile images between the digital camera and a remote user.

It is another object of the present invention to provide a digital camera having an integrated wireless transmitter for transmitting captured digital images from the digital camera to a remote user.

It is a further object of the present invention to provide a digital camera having an integrated wireless receiver for receiving captured digital images transmitted to the digital camera from a remote user.

In carrying out the above objects and other objects, the present invention provides a handheld, portable device for capturing and communicating digital images. The device includes a digital camera having an electronic image sensor for sensing an image and producing a digital image indicative of the sensed image. The device further includes a wireless transceiver having a transmitter operable with the digital camera for transmitting the digital image over a wireless communications link through the establishment of a data call.

Further, in carrying out the above objects and other objects, the present invention provides a system for digital image capture and communication. The system includes a first device and a second device. The first device has a digital camera and a wireless transceiver. The digital camera has an electronic image sensor for sensing an image and producing a digital image indicative of the sensed image and a display for displaying digital images. The wireless transceiver is operable with the digital camera for transmitting digital images sensed by the electronic image sensor over a wireless communications link through the establishment of a data call. The wireless transceiver is further operable with the digital camera for receiving digital images and then displaying the received digital images on the display. The second device has a wireless transceiver for communicating digital images over the wireless communications link through the establishment of a data call with the wireless transceiver of the first device.

The advantages associated with the device having a digital camera and an integrated wireless transceiver are numerous. For instance, the device has potential to become a consumers electronics device. Early adopters are likely to be corporate executives, sales forces, and journalists. The device may be marketed as a top of the line mobile phone or personal digital assistant (PDA) system. The device may also be used in business, home, automobile, and personal security systems.

The above objects and other objects, features, and advantages of the present invention will be apparent from the following detailed description of the best mode for carrying in connection with the accompanying drawings.

BEST MODE FOR CARRYING OUT THE INVENTION

Figure 1:
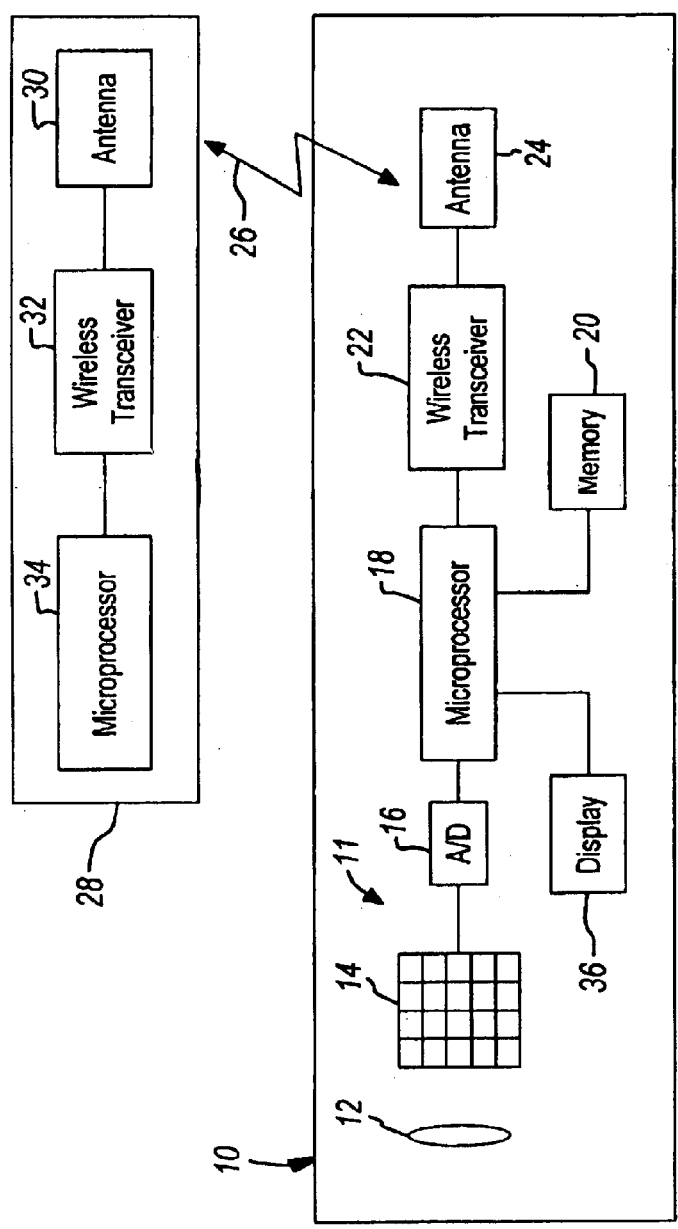
FIG. 1 illustrates a block diagram of a device having a digital camera and an integrated wireless transceiver in accordance with the present invention.

Referring now to FIG. 1, a handheld, portable device 10 having a digital camera and integrated wireless transceiver in accordance with the present invention is shown. Device 10 includes a digital camera 11. Digital camera 11 includes a lens 12 for forming digital images of a scene being viewed onto a solid state image sensor 14. An analog to digital converter 16 converts a signal formed by solid state image sensor 14 to a digital image signal, i.e., digital image. A microprocessor 18 controls digital camera 11 and receives the digital image from converter 16. Microprocessor 18 may then store the digital image to memory 20. Memory 20 stores the digital image local to a wireless transceiver 22. Memory 20 may be permanently fixed memory such as a hard drive or may be portable memory such as flash cards, mini disks, tape, and the like. Wireless transceiver 22 includes a transmitter and a receiver. Wireless transceiver 22 is operable with microprocessor 18 and memory 20 for transmitting the digital image through an antenna 24 over a wireless communication link 26 such as the air. Device 10 uses memory 20 such that the digital image may be stored for later transfer either by a wireless network, a cabled interface, or infrared to another device or remote user.

At the option of a user using device 10, wireless transceiver 22 transmits the digital images signals to a remote user 28. Remote user 28 may be a second device such as device 10, an email address, a film developer, a server, a security system, and the like. Remote user 28 includes an antenna 30, a wireless transceiver 32, and a microprocessor 34. Wireless transceiver 22 transmits the digital image to remote user 28 through the establishment of a data call. Wireless transceiver 22 may transmit the digital image autonomously or according to a predetermined schedule. Wireless transceiver 22 may transmit digital images as a function of a predetermined amount of memory 20 having stored digital images.

In addition to transmitting digital images to remote user 28, wireless transceiver 22 of device 10 is operable with the remote user to receive digital images from the remote user. Wireless transceiver 22 provides the received digital images to microprocessor 18. A display 36 is operable with microprocessor 18 for displaying the received digital images for the user of device 10 to view.

Figure 2:
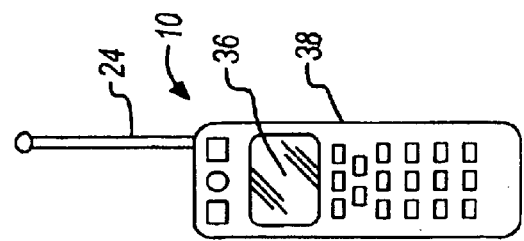
FIG. 2 illustrates a front view of a handheld device having the digital camera and integrated wireless transceiver in accordance with the present invention.

Referring now to FIG. 2, a front view of device 10 is shown. Device 10 includes a housing 38 for housing digital camera 11 and wireless transceiver 22. Lens 12 may be fixed or movable with respect to housing 38 and display 36 may be recessed or protruding with respect to the housing. Lens 12 and display 36 may be controlled remotely by a wired interface so as to facilitate concealment of the imager in an appropriate location. This may be of benefit in a security application of device 10.

By combining wireless technology with digital camera technology in accordance with the present invention, device 10 is capable of the following applications: point and click wireless facsimile, wireless payphone facsimile, wireless copying of printed material, wireless pocket camera, handheld journalism device, wireless visual security systems for home, automobile, business, and remote locations, picture telephone, video telephone, and the like. Preferably, wireless transceiver 22 of device 10 is operable for establishing simultaneous voice and data connections. Establishing simultaneous voice and data connections allows for a video conference, the showing of pictures of self, scenery, printed material, and the like to be conducted during a voice conversation.

Thus, it is apparent that there has been provided, in accordance with the present invention, a device having a digital camera and an integrated wireless transceiver that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A handheld, portable dual camera and telephone device for capturing and communicating digital still images with a remote user and for communicating voice signals with the remote user, the device comprising:

a housing configured to be portably hand-held by a user;

a display on the housing for displaying digital still images for the user to view;

a digital camera in the housing, the digital camera having an electronic image sensor for sensing a still image and producing a digital still image indicative of the sensed still image in response to a user using the digital camera; and a wireless transceiver in the housing, the wireless transceiver having a transmitter operable with the digital camera for transmitting the digital still image over a wireless communications link through the establishment of a data call to a remote user without the digital still image being temporarily stored in memory associated with the digital camera, wherein the transmitter transmits the digital still image over the wireless communications link through the establishment of the data call to the remote user autonomously;

the wireless transceiver further having a receiver operable for receiving digital still images taken by another digital camera and transmitted by the remote user over the wireless communication link through the establishment of a data call, wherein the digital camera is operable with the wireless transceiver to produce the received digital still images on the display for the user to view;

wherein the wireless transceiver is operable for establishing a voice call for communicating voice signals with the remote user simultaneously with a data call.

2. A handheld, portable dual camera and telephone device for capturing and communicating digital still images with a remote user and for communicating voice signals with the remote user, the device comprising:

a housing configured to be portably hand-held by a user;

a display on the housing for displaying digital still images for the user to view;

a digital camera in the housing, the digital camera having an electronic image sensor for sensing a still image and producing a digital still image indicative of the sensed still image in response to a user using the digital camera, wherein the digital still image is a facsimile; and a wireless transceiver in the housing, the wireless transceiver having a transmitter operable with the digital camera for transmitting the digital still image over a wireless communications link through the establishment of a data call to a remote user without the digital still image being temporarily stored in memory associated with the digital camera, wherein the transmitter transmits the digital still image over the wireless communications link through the establishment of the data call to the remote user autonomously;

the wireless transceiver further having a receiver operable for receiving digital still images taken by another digital camera and transmitted by the remote user over the wireless communication link through the establishment of a data call, wherein the digital camera is operable with the wireless transceiver to produce the received digital still images on the display for the user to view;

wherein the wireless transceiver is operable for establishing a voice call for communicating voice signals with the remote user simultaneously with a data call.

* * * * *